US012620289B2

(12) United States Patent (10) Patent No.: US 12,620,289 B2
Gronau et al. (45) Date of Patent: May 5, 2026

(54) ANTI-COUNTERFEIT VERIFICATION

(71) Applicant: ANGEL GROUP CO., LTD., Shiga (JP)

(72) Inventors: Gregory Gronau, Las Vegas, NV (US); Emmanuel Gelinotte, Savigny les Beaune (FR); Jonathan Nathanael Souillot, St. Marcel (FR)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 18/131,000

(22) Filed: Apr. 5, 2023

(65) Prior Publication Data

US 2023/0252842 A1 Aug. 10, 2023

Related U.S. Application Data

(63) Continuation of application No. 16/652,770, filed as application No. PCT/US2018/053837 on Oct. 2, 2018, now abandoned.

(Continued)

(51) Int. Cl.
| | |
|---|---|
| *G07F 17/32* | (2006.01) |
| *G06K 17/00* | (2006.01) |
| *G06K 19/04* | (2006.01) |
| *G06K 19/06* | (2006.01) |
| *G06K 19/18* | (2006.01) |

(52) U.S. Cl.
CPC ....... *G07F 17/322* (2013.01); *G06K 17/0029* (2013.01); *G06K 19/047* (2013.01); *G06K 19/06028* (2013.01); *G06K 19/18* (2013.01); *G07F 17/3241* (2013.01)

(58) Field of Classification Search
CPC ............ G06K 17/0029; G06K 19/047; G06K 19/06028; G06K 19/18; G06K 19/07; G06K 19/10; G07F 17/3241
See application file for complete search history.

(56) References Cited

U.S. PATENT DOCUMENTS 7,862,434 B2 1/2011 Miller et al.
10,846,980 B2 * 11/2020 French ................ G07F 17/3251
(Continued)

FOREIGN PATENT DOCUMENTS

| AU | 2017224997 A1 | 9/2017 |
|---|---|---|
| JP | 2009066173 A | 4/2009 |
| JP | 2017064386 A | 4/2017 |

OTHER PUBLICATIONS

International Search Report Report dated Dec. 4, 2018 issued for PCT application No. PCT/JP2018/053837.
(Continued)

*Primary Examiner* — Steven S Paik
*Assistant Examiner* — Asifa Habib
(74) *Attorney, Agent, or Firm* — NORTON ROSE FULBRIGHT US LLP

(57) ABSTRACT

A first reading can be determined of gaming chips in a gaming area using a first identification technology. The first reading can include a count of gaming chips. A second reading can be determined of gaming chips in a gaming area using a second identification technology. The second reading can include a count of gaming chips. A variance can be identified between the first reading and the second reading.

27 Claims, 4 Drawing Sheets

Related U.S. Application Data

(60) Provisional application No. 62/566,650, filed on Oct. 2, 2017.

(56) References Cited

U.S. PATENT DOCUMENTS

| | | | |
|---|---|---|---|
| 2002/0147511 A1 | 10/2002 | Eryurek et al. | |
| 2005/0230479 A1 | 10/2005 | Chapman et al. | |
| 2009/0075725 A1 | 3/2009 | Koyama | |
| 2012/0208622 A1 | 8/2012 | Delaney et al. | |
| 2017/0039807 A1 | 2/2017 | Shigeta | |
| 2018/0068525 A1* | 3/2018 | Shigeta | A63F 1/18 |
| 2018/0114406 A1* | 4/2018 | Shigeta | A63F 1/065 |
| 2019/0108710 A1* | 4/2019 | French | G07F 17/3267 |
| 2020/0234529 A1* | 7/2020 | Gronau | G06K 19/047 |
| 2020/0402357 A1* | 12/2020 | Moore | G07F 17/3241 |
| 2021/0134114 A1* | 5/2021 | Wingate | G07F 17/3225 |
| 2021/0233355 A1* | 7/2021 | Shigeta | G07F 17/3223 |
| 2021/0233356 A1* | 7/2021 | Shigeta | A63F 1/065 |
| 2021/0248871 A1* | 8/2021 | Gelinotte | G07F 17/322 |
| 2021/0335081 A1* | 10/2021 | Gelinotte | G07F 17/322 |
| 2023/0298429 A1* | 9/2023 | Gelinotte | G07F 17/3232 |
| | | | 463/25 |

OTHER PUBLICATIONS

Japanese Office Action dated Oct. 25, 2022 issued in JP Application 2020-518807.

Korean Office Action dated May 18, 2023 issued for KR application No. 10-2020-7012477.

* cited by examiner

ANTI-COUNTERFEIT VERIFICATION

CROSS-REFERENCE TO RELATED APPLICATIONS

This application is a continuation of U.S. patent application Ser. No. 16/652,770 filed Apr. 1, 2020, which is a national phase application under 35 U.S.C. § 371 of International Pat. App. No. PCT/US2018/053837 filed Oct. 2, 2018, which claims the benefit of U.S. Provisional Pat. App. No. 62/566,650 filed Oct. 2, 2017, the entire contents of each disclosure are hereby incorporated herein by reference.

SUMMARY

A non-transitory computer-readable medium embodying a program can be executed by at least one computing device. The program can causes the at least one computing device to determine a first reading of gaming chips based at least in part on a first identification technology. The first reading can include a first set of counts and a first set of values. The program can cause the at least one computing device to determine a second reading of the gaming chips based at least in part on a second identification technology. The second reading can include a second set of counts and a second set of values. In response to a variance between the first reading and the second reading, the program can cause the at least one computing device to perform at least one remedial action.

The variance between the first reading and the second reading can correspond to a first game. The program can cause the at least one computing device to display a first indicator as the at least one remedial action and display a second indicator in response to no variance existing in a second game. The program can cause the at least one computing device to receive an indication that the first game is complete and clear the first indicator. The program can cause the at least one computing device to determine a third reading of gaming chips based at least in part on a third identification technology. The third reading can include a third set of counts and a third set of values. In response to a variance between the first reading and the third reading or the second reading and the third reading, the program can cause the at least one computing device to perform at least one additional remedial action.

The first reading can include a set of values that individual correspond to the gaming chips in at least one of a casino cage, a bank, or a vault. The program can cause the at least one computing device to determine that an RFID tag from the gaming chips is defective based at least in part on the variance. The at least one remedial action can include stopping a game at a gaming table until an approval is received.

A system can include a memory and at least one computing device coupled to the memory. The at least one computing device can be configured to determine a first reading of gaming chips in a gaming area based at least in part on a first identification technology and determine a second reading of the gaming chips on the gaming table based at least in part on a second identification technology. The first reading can include a first set of counts and the second reading can include a second set of counts. The at least one computing device can be configured to identify at least one variance between the first reading and the second reading.

The first reading further can include a set of values that individual correspond to the gaming chips in the gaming area. The determination of the first reading of gaming chips that is based at least in part on the first identification technology can include reading a plurality of RFID tags from RFID-enabled gaming chips. Further, the determination of the second reading of the gaming chips based at least in part on the second identification technology can include identifying the plurality of RFID tags in frames of a video feed from a camera.

The at least one computing device can be configured to determine that an RFID tag from the RFID-enabled gaming chips is defective based at least in part on the at least one variance. The at least one computing device can be configured to determine a third reading of gaming chips in the gaming area based at least in part on a third identification technology. The third reading can include a third set of counts and a third set of values. The determination of the third reading of gaming chips based at least in part on the third identification technology can include reading a plurality of bar codes from the RFID-enabled gaming chips.

A method can include determining, via at least one computing device, a first reading of gaming chips in a gaming area based at least in part on a first identification technology. The first reading can include a first set of counts and a first set of values. The method can include determining, via the at least one computing device, a second reading of the gaming chips in the gaming area based at least in part on a second identification technology. The second reading can include a second set of counts and a second set of values. In response to a variance between the first reading and the second reading, the method can include performing, via the at least one computing device, at least one remedial action. The method can include displaying a first indicator in response to the variance between the first reading and the second reading in a first game, and displaying a second indicator in response to no variance existing in the second game.

The first reading can include a set of values that individual correspond to the gaming chips on at least one position on a gaming table. The method can include reading a plurality of RFID tags from RFID-enabled gaming chips. Determining the second reading of the gaming chips based at least in part on the second identification technology can include identifying the plurality of RFID tags in frames of a video feed from a camera.

The method can include determining that an RFID tag from the RFID-enabled gaming chips is defective based at least in part on the variance. The method can include determining a third reading of gaming chips in the gaming area based at least in part on a third identification technology. The third reading can include a third set of counts and a third set of values. The method can include reading a plurality of bar codes from the RFID-enabled gaming chips.

BACKGROUND

Gaming chips can be used in a casino in lieu of currency. The gaming chips can be made from various materials including colored metals, injection-molded plastics, and compression molded clay. Some casinos can include technology to identify a gaming chip. However when the technology fails, a casino may misidentify a gaming chip.

BRIEF DESCRIPTION OF THE DRAWINGS

For a more complete understanding of the embodiments and the advantages thereof, reference is now made to the following description in conjunction with the accompanying figures briefly described as follows.

Figure 1:
FIG. 1 is a drawing of an example gaming environment according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present disclosure may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having," and variations thereof herein, is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. With reference to FIG. 1, shown is a gaming environment 100 according to various embodiments of the present disclosure. The gaming environment 100 can include one or more gaming tables 103. Although various aspects of the present disclosure refer to a gaming table, it can be appreciated that the various aspects can be used with respect to any gaming area including a casino cage, a bank, a vault, a gaming table, or any other location where gaming chips are used. A dealer can facilitate a wagering game at the gaming table 103. Wagering games can include a card game, a dice game, a wheel-based game, or some other wagering game. One or more patrons can wager gaming chips at the gaming table 103. The gaming chips can be counted and verified by various components of a networked environment as discussed herein.

Multiple technologies can be used when validating wagers on a gaming table 103. When a discrepancy exists in the validation, a remedial action can be performed. As a non-limiting example, when a RFID-enabled gaming chip has a broken RFID tag, a discrepancy between a count of gaming chips from an RFID technology and a vision-based technology can exist. The vision-based technology can visually identify the broken RFID-enabled gaming chip, but the RFID-based technology cannot. The casino can replace the broken RFID-enabled gaming chip with a functional RFID-enabled gaming chip to remedy the discrepancy.

Figure 2:
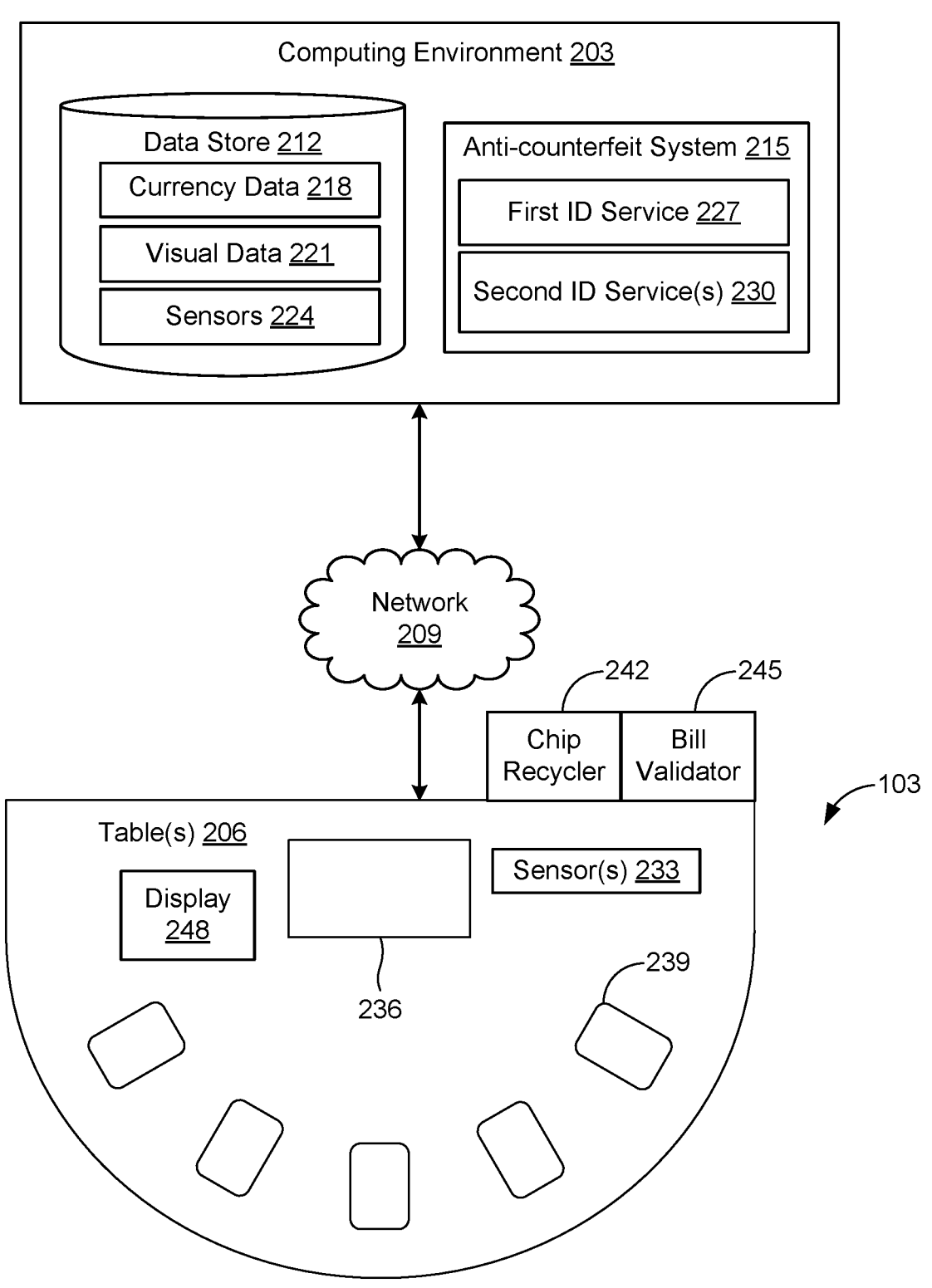
FIG. 2 is a drawing of a networked environment according to various example embodiments.

With reference to FIG. 2, shown is a networked environment 200 according to various embodiments. The networked environment 200 can be deployed in a gaming environment 100. The networked environment 200 includes a computing environment 203 and one or more gaming table devices 206 in a gaming table 103, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 can include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an anti-counterfeit system 215, and other applications, services, processes, systems, engines, or functionality not discussed in detail herein. The anti-counterfeit system 215 is executed to detect broken, malfunctioning, and counterfeit chips being used identifying discrepancies between two or more counterfeit identification methodologies. As an example, an RFID tag in RFID-enabled gaming chip can break. An RFID identification service will fail to read the broken RFID-enabled gaming chip, but a visual identification of the gaming chip from a video feed can detect the gaming chip. An identification methodology can include determining at least one characteristic of the gaming chip or a person, such as, for example, a count, a denomination, a weight, a color, a pattern, a barcode, a height of a stack of gaming chips, actions of a person, or another characteristic. In the previous example, the visual identification may detect that seven chips were placed on a bet spot, which can be compared to six RFID tags being read by the RFID identification service to determine a discrepancy exists. Similarly, a weighted scale can detect the broken RFID-enabled gaming chip. The anti-counterfeit system 215 can determine a discrepancy among the identification services and take a remedial action.

The data stored in the data store 212 includes, for example, currency data 218, visual data 221, sensors 224, and potentially other data. The currency data 218 can include a list of all active gaming chips including any identifiers associated with the gaming chips, such as, for example, RFID tag identifiers, barcode identifiers, and other identifiers. The visual data 221 can be used to facilitate visual recognition of different gaming chips. The sensors 224 can store a history of sensor inputs received as well as any configuration, calibration, and control settings.

The gaming table device 206 is representative of a plurality of gaming table devices that may be coupled to the network 209. The gaming table devices 206 can include, for example, one or more computing devices with a processor-based system such as a computer system. Such a computer system may be embodied in the form of an embedded computing device or other devices with like capability. The gaming table device 206 can include one or more sensors 233, chip tray 236, one or more bet spots 239, a chip recycler 242, and a bill validator 245.

The sensors 233 can include RFID antennas, video cameras, barcode scanners, weigh scales, and other sensors. Different types of sensors 233 can correspond to different identification services, such as, for example, the first identification service 227 and second identification service 230. The sensors 233 can be used to identify gaming chips played on a gaming table. The gaming chips can include any chip, plaque, jeton, or other gaming currency that may be used in a casino or gaming room. The gaming chips can represent a value that is predetermined or not. Gaming chips can be made from a rigid plastic material or clay to obtain a structure that is solid enough to resist conditions of use in casinos. Gaming chips can be used throughout a casino. For example, at gaming tables, gaming chips can be received for play or the conclusion of a game or hand, cash can be received and gaming chips paid out (buy-in), and gaming chips may be paid out during play. In a cashier area, gaming chips can be received and cash can be paid out (cash out). Alternatively, cash can be received and gaming chips can be paid out (buy-in).

The first identification service 227 or the second identification service 230 can validate RFID currency based on information read from sensors 233 that are RFID antennas.

An RFID antenna can be positioned at the chip tray 236, at each of the bet spots 239, at the chip recycler, and in another positions. The gaming table device 206 can read RFID tags from RFID-enabled gaming chips using the RFID antennas. The information from the RFID tags can be stored along with data related to RFID antenna read the RFID tag. For example, an identifier from RFID-enabled gaming chips can be read by an RFID antenna at a particular bet spot 239. The gaming table device 206 can determine a patron placed a wager of the RFID-enabled gaming chips based on a corresponding to the particular bet spot 239 where the wager was placed. The gaming table device 206 can transmit a count of gaming chips read at each of the RFID antennas including the identifiers from each chip. In one embodiment, the gaming table device 206 performs a read of all RFID antennas at least one per game being played, and transmits the count to the anti-counterfeit system 215 after each game. The gaming table device 206 can perform reads of all RFID antennas several times per game. In some embodiments, the gaming table device 206 sends any changes in reading of RFID-enabled gaming chips that occur during the game.

The first identification service 227 or the second identification service 230 can validate gaming chips using a sensor 233 that corresponds to a camera. One or more cameras can be positioned on the table or separate from the table. Cameras can be positioned overhead or above the table. Cameras can also be positioned on the table, such as, for example in a chip tray, chip recycler, on top of a bill validator, or at another position. The cameras can record a video stream of various angles or segments of the table. For example, multiple cameras can be positioned in the chip tray 236 pointing toward the bet spots 239. A camera can be directed to a single bet spot 239 or a group of bet spots 239. In one embodiment, the gaming table device 206 can join or stitch together video feeds from multiple cameras to generate a video feed of an area, such as, for example a video feed for all bet spots 239.

The gaming table device 206 can determine a count and denomination of gaming chips at a variety of positions on the table. For example, the gaming table device 206 can determine a separate count and denomination for gaming chips at the chip tray 236, each bet spot 239, the chip recycler, and other positions. The gaming table device 206 or the identification service 227/230 can perform image recognition on frames of the video feed to identify information for each position. For example, a height of a stack of gaming chips can be determined, and the count of the chips can be calculated based on the height.

In some embodiments, one or more cameras may capture the playing cards being played on the gaming table 103 while one or more other cameras may capture the gaming chips being played on the gaming tables. The gaming table device 206 or the identification service 227/230 can perform image recognition on frames of the video feed to identify card play information in addition to gaming chip information. An outcome of each wagering game can be determined based on the playing cards played. The anti-counterfeit system 215 can determine a discrepancy in gaming chips paid to a patron based on the outcome of the wagering game.

The denomination of each of the gaming chips in the stack can be determined based on various visual characteristics. In one example, a color pattern on the edge of the gaming chips can be used to determine the denomination. In another example, one or more visual security features can be used to determine the denomination. For example, each denomination of currency can have a different holographic symbol or other visual security protection. The gaming table device 206 can determine the denomination by identifying which visual security protection each gaming chip in a video feed contains.

Similar to the RFID antenna, the gaming table device 206 can transmit a count of gaming chips identified in the video stream at each position including any visual security information identified. In one embodiment, the gaming table device 206 performs a visual analysis of one of more frames of a video feed for at least one per game being played, and transmits the count to the anti-counterfeit system 215 after each game. The gaming table device 206 can perform the visual analysis several times per game, up to once per frame. In some embodiments, the gaming table device 206 sends any changes count or denomination that occur during the game.

The first identification service 227 or the second identification service 230 can validate gaming chips using a sensor 233 that corresponds to a weighted scale or a laser. A weighted scale can be positioned under each bet spot 239 to weigh chips on the bet spot 239. A laser can measure the height of a stack of gaming chips on the table. A weighted scale can also be positioned to weight the chip tray 236 and chip recycler 242. Similarly, the laser can be positioned to determine a count of gaming chips at the chip tray 236 and chip recycler 242

The gaming table device 206 can determine a count of chips in a position based on a weight or height measured at the position and a weight or height of the gaming chips. In some embodiments, the gaming chips for different denominations can have different weights or heights. The denominations can be grouped with other denominations within a group share the same weight or height. For example, gaming chips at or over $1,000 may have a higher weight and height than gaming chips under $1,000. Similar to the RFID antenna and the camera sensors 233, the gaming table device 206 can transmit a count of gaming chips identified by the scales or laser at each position to the anti-counterfeit system 215 including any weight or height information identified.

The first identification service 227 or the second identification service 230 can validate gaming chips using a sensor 233 that corresponds to a barcode scanner. The barcode scanner can read barcodes positioned on gaming chips. The barcodes positioned on the gaming chips by being printed, laser marked, embossed, brought by the injection molding, or other technique. In one embodiment, the gaming chips can be scanned when passed through the chip recycler 242. Similar to the RFID antenna, the camera, and weighted scale sensors 233, the gaming table device 206 can transmit a count of gaming chips identified by the barcode scanner to the anti-counterfeit system 215 including any identifying information, such as the barcode.

The gaming table device 206 may be configured to execute various applications. The applications may be executed in a gaming table device 206, for example, to identify gaming activity occurring on a gaming table based on data from the sensors 233. The gaming table device 206 can communicate with the computing environment 203 via the network 209 to analyze and validate the identified gaming activity. The gaming table device 206 can be affixed to a gaming table, such as being attached to the bottom of the gaming table. In some embodiments, the gaming table device 206 is separate from the gaming table. For example, the gaming table device 206 can be positioned in the ceiling or in a closet.

The gaming table device 206 can include a first device positioned at the gaming table, while a second device is positioned elsewhere. As an example, a gaming table device 206 can be coupled to RFID antennas at the table, while another gaming table device 206 is coupled to cameras mounted to the ceiling of a casino. In some embodiments, a portion of the functionality described as being performed by the gaming table device 206 can be performed in the computing environment 203. Similarly, some of the functionality described as being performed by the anti-counterfeit system 215 can be performed by the gaming table device 206.

The chip recycler 242 can operate in a similar fashion to a coin recycler. The chip recycler 242 can be used in addition to or in place of chip tray 236. At the end of game or hand, if a dealer has collected gaming chips from players, the gaming chips can be placed into an input area, such as a funnel, hopper or tube, and then validated (authenticated), counted, sorted, and stored by the chip recycler 242. If gaming chips are to be paid out to players, or in exchange for cash, or exchanged for other gaming chips, then the gaming table device 206 or from a table management system or the control system executed in the computing environment 203, can instruct the chip recycler 242 how much in gaming chips and which denominations to pay out. A chip recycler 242 within a cashier cage, a bank or vault, or kiosk (not shown) can operate in a similar fashion. A user places the gaming chips in the chip recycler 242, the chip recycler 242 processes the gaming chips, and the chip recycler 242 either automatically outputs gaming chips in other denominations or outputs cash equal to the input value.

The anti-counterfeit system 215 can receive a count of gaming chips at one or more gaming table from multiple identification services. The anti-counterfeit system 215 can verify that the counts match among the multiple identification services. As an example, the anti-counterfeit system 215 can determine a visually identified count and denomination based on a video feed can be compared to a count and denomination of RFID tags read. If the counts or denominations do not match, the anti-counterfeit system 215 can initiate a remedial action.

The anti-counterfeit system 215 can initiate a remedial action, such as, for example, stopping a game until approval for an authorized user is received, alerting security, identifying a patron corresponding to the discrepancy and storing an indication of the discrepancy associated with an account of the patron, and other remedial actions. The level of an authorized user can be based on the discrepancy identified. For example, a higher level of authorized user can be required when a count, a denomination, or total value of the discrepancy exceeds a threshold. The anti-counterfeit system 215 can have multiple tiers of thresholds corresponding to different levels of authorized user. In one example, the dealer can authorize resuming play when the value of the discrepancy is below a first threshold, such as $10, a pit boss can authorize resuming play when the value of the discrepancy is below a second threshold, such as $100, and security can authorize resuming play when the value of the discrepancy is below a third threshold, such as $1000. Further, a casino manager may be required to resume play when the discrepancy exceeds the top threshold.

The thresholds may be based on past actions of a patron, dealer, or other authorized user associated with the discrepancy. For example, the anti-counterfeit system 215 can identify a patron with a history that includes a pattern of discrepancies or a total amount of discrepancies exceeding a threshold, and initiate a more restrictive remedial action based on the repetition. For example, the more restrictive remedial action may require approval from a user with authority to authorize the sum of all historical discrepancies for the patron.

In some embodiments, the sum of all historical discrepancies can be limited to the discrepancies that have occurred since a previous more restrictive remedial action. Similarly, the anti-counterfeit system 215 can identify a dealer, pit boss, security officer, casino manager, or other casino employee with a history of discrepancies. The anti-counterfeit system 215 can identify a user with a specific statistical property that exceeds a threshold. As an example, the anti-counterfeit system 215 can calculate a ratio of games played to discrepancies identified. If the ratio exceeds a threshold, the anti-counterfeit system 215 can initiate a remedial action.

Figure 3:
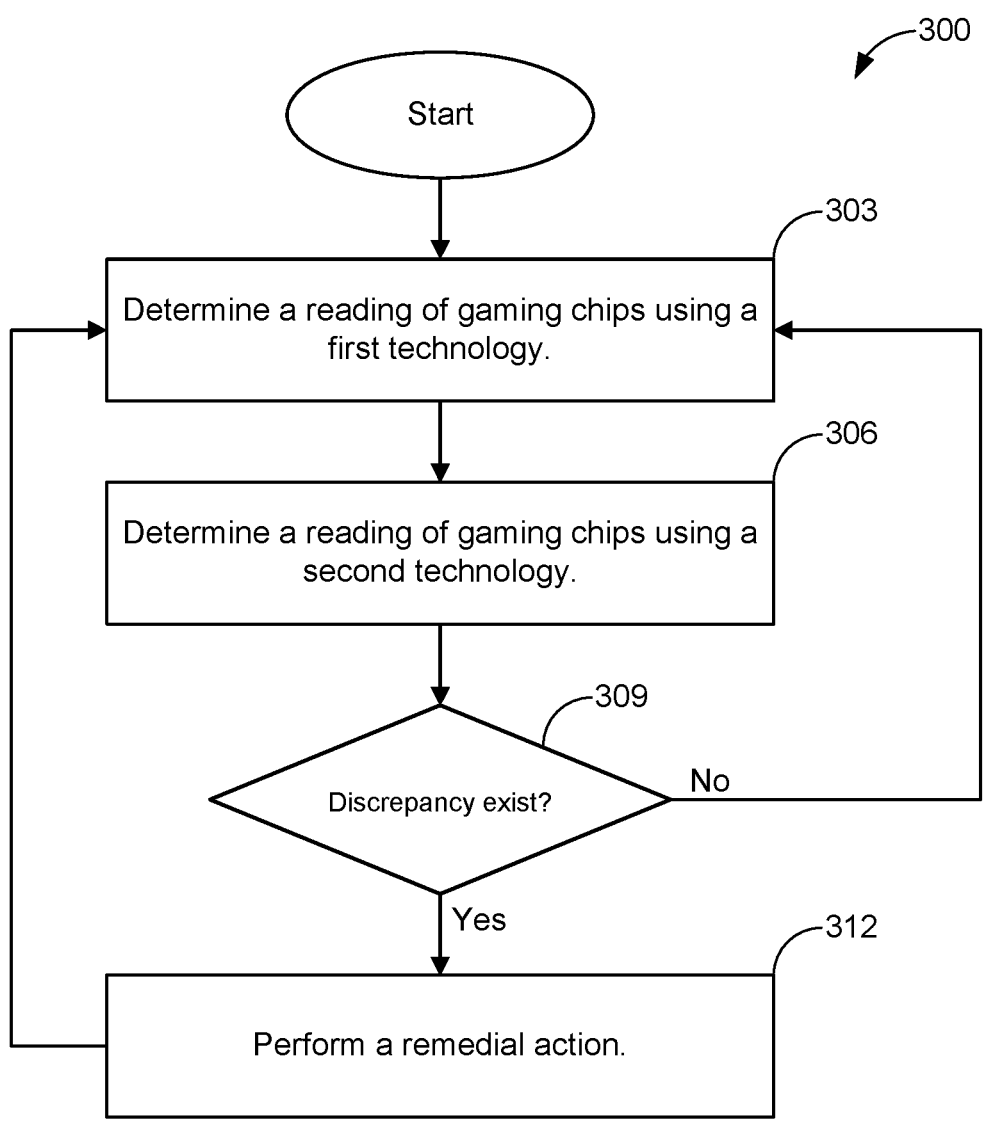
FIG. 3 is a flowchart of a process performed in the networked environment of FIG. 1 according to various embodiments of the present disclosure.

Referring next to FIG. 3, shown is a flowchart of a process 300 according to various embodiments. It is understood that the flowchart of FIG. 3 provides merely an example of the many different types of functional arrangements that may be employed to implement the operation of the portion of the anti-counterfeit system 215 as described herein. As an alternative, the flowchart of FIG. 3 may be viewed as depicting an example of elements of a method implemented in the computing environment 203 (FIG. 2) and the gaming table device 206 according to one or more embodiments.

Beginning with box 303, the process 300 can include determining a reading of gaming chips using a first technology. The reading can include a count of gaming chips, a denomination of gaming chips, and/or identifiers for each gaming chip. As one example, an RFID tags in RFID enabled gaming chips can be read using one or more RFID antenna positioned at the chip tray 236, at each of the bet spots 239, at the chip recycler, and in other positions. The first ID service 227 can determine an identifier for each RFID At box 306, the process 300 can include determining a reading of gaming chips using a second technology. One or more cameras, scales, or some other technology can be used to perform a reading of gaming chips. The reading can include a count of gaming chips, a denomination of gaming chips, and/or identifiers for each gaming chip.

At box 309, the process 300 can include determining whether a discrepancy exists between the first reading and the second reading. In some embodiments, a discrepancy is determined between any two or more readings from any number of technologies. The discrepancy can correspond to a difference in a count if gaming chips, a difference in denomination of gaming chips, or some other discrepancy. A discrepancy can correspond to a color mismatch for a particular gaming chip. As an example, a gaming chip with an identifier "123" may have been manufactured as a blue and white gaming chip. In some embodiments, the first reading and the second reading can include different amounts of information. As an example, the first reading may include a count of gaming chips as well as denominations, while the second reading may include only a count or a range of potential counts. A discrepancy may exist when a count of the first reading falls outside of the range of potential counts. As an example, the range of potential counts may vary when a stack of gaming chips may be partially or fully obscured from a camera or when a scale is used to determine a weight of gaming chips.

The anti-counterfeit system 215 can determine a discrepancy exists based on the first reading identifying a gaming chip as the gaming chip "123" while the second reading determines the gaming chip "123" is red and orange. If a discrepancy exists, the process 300 proceeds to box 309. Otherwise, the process 300 moves to box 303.

At box 312, the process 300 can include performing a remedial action. As an example, the anti-counterfeit system 215 can prevent the current game from completing until the discrepancy is resolved. As another example, the anti-counterfeit system 215 can activate an indicator to inform the dealer that a problem exists. A red and green indicator can be positioned in view of a dealer at a gaming table 103. The red indicator can be illuminated when a discrepancy exists while a green indicator can be illuminated when no discrepancy is determined. The remedial action can include replacing a defective gaming chip. In some embodiments, a history of discrepancies is kept for each patron, dealer, or other person. The remedial action can escalate through a set of remedial actions based on the history of discrepancies. As a non-limiting example, a first discrepancy can result in a log entry while a tenth discrepancy can result in security being alerted.

Figure 4:
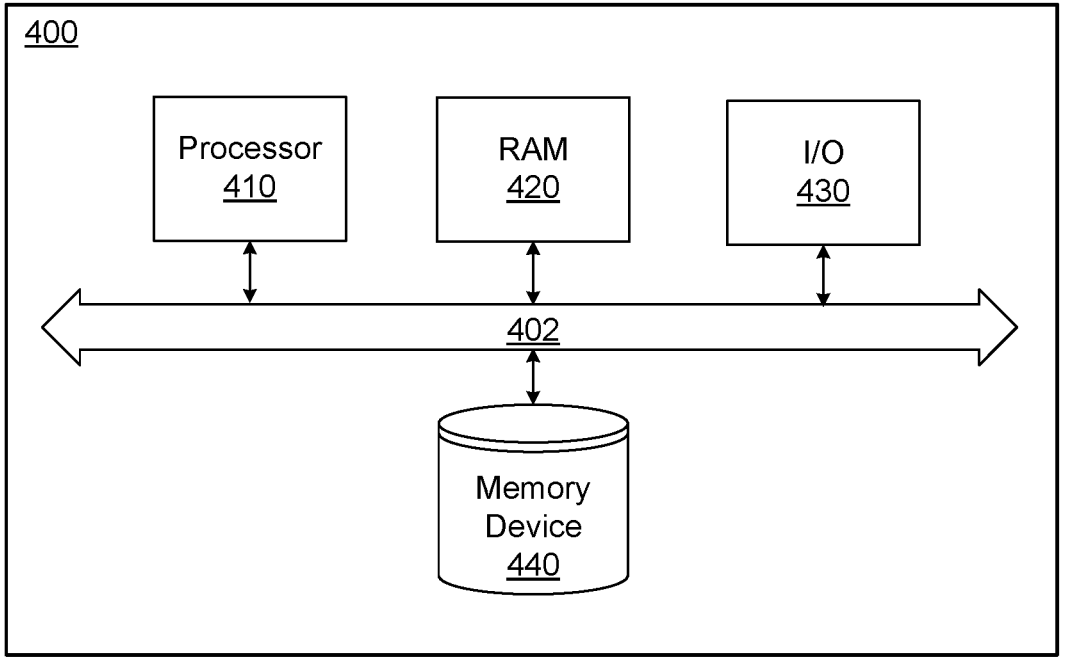
FIG. 4 is a schematic block diagram that illustrates an example computing environment employed in the networked environment of FIG. 1 according to various embodiments.

With reference to FIG. 4, shown is a schematic block diagram of the computing environment 203 according to an embodiment of the present disclosure. The computing environment 203 and the gaming table device 206 include one or more computing devices 400. Each computing device 400 includes at least one processor circuit, for example, having a processor 410 and a memory 440, both of which are coupled to a local interface 402. To this end, each computing device 400 can include, for example, at least one server computer or like device. The local interface 402 can include, for example, a data bus with an accompanying address/ control bus or other bus structure as can be appreciated.

Stored in the memory 440 are both data and several components that are executable by the processor 410. In particular, stored in the memory 440 and executable by the processor 410 are the anti-counterfeit system 215, applications in the gaming table device 206, and potentially other applications. Also stored in the memory 440 may be a data store 212 and other data. In addition, an operating system may be stored in the memory 440 and executable by the processor 410.

It is understood that there may be other applications that are stored in the memory 440 and are executable by the processor 410 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 440 and are executable by the processor 410. In this respect, the term "executable" means a program file that is in a form that can ultimately be run by the processor 410. Examples of executable programs may be, for example, a compiled program that can be translated into machine code in a format that can be loaded into a random access portion of the memory 440 and run by the processor 410, source code that may be expressed in proper format such as object code that is capable of being loaded into a random access portion of the memory 440 and executed by the processor 410, or source code that may be interpreted by another executable program to generate instructions in a random access portion of the memory 440 to be executed by the processor 410, etc. An executable program may be stored in any portion or component of the memory 440 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 440 is defined herein as including both volatile and nonvolatile memory and data storage components. Volatile components are those that do not retain data values upon loss of power. Nonvolatile components are those that retain data upon a loss of power. Thus, the memory 440 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 410 may represent multiple processors 410 and/or multiple processor cores and the memory 440 may represent multiple memories 440 that operate in parallel processing circuits, respectively. In such a case, the local interface 402 may be an appropriate network that facilitates communication between any two of the multiple processors 410, between any processor 410 and any of the memories 440, or between any two of the memories 440, etc. The local interface 402 may comprise additional systems designed to coordinate this communication, including, for example, performing load balancing. The processor 410 may be of electrical or of some other available construction.

Although the anti-counterfeit system 215, applications in the gaming table device 206, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the anti-counterfeit system 215 and applications in the gaming table device 206, that includes software or code can be embodied in any non-transitory computer-readable medium for use by or in connection with an instruction execution system such as, for example, a processor 410 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM) or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the anti-counterfeit system 215, applications in the gaming table device 206, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Clause 1. A non-transitory computer-readable medium embodying a program that, when executed by at least one computing device, causes the at least one computing device to at least: determine a first reading of gaming chips based at least in part on a first identification technology, the first reading comprising a plurality of first counts and a plurality of first values; determine a second reading of the gaming chips based at least in part on a second identification technology, the second reading comprising a plurality of second counts and a plurality of second values; and in response to a variance between the first reading and the second reading, perform at least one remedial action.

Clause 2. The non-transitory computer-readable medium of clause 1, wherein the variance between the first reading and the second reading corresponds to a first game and the program further causes the at least one computing device to at least: display a first indicator as the at least one remedial action; and display a second indicator in response to no variance existing in a second game.

Clause 3. The non-transitory computer-readable medium of clause 2, wherein the program further causes the at least one computing device to at least: receive an indication that the first game is complete; and clear the first indicator.

Clause 4. The non-transitory computer-readable medium of clauses 1-3, wherein the program further causes the at least one computing device to at least: determine a third reading of gaming chips based at least in part on a third identification technology, the third reading comprising a plurality of third counts and a plurality of third values; and in response to a variance between the first reading and the third reading or the second reading and the third reading, perform at least one additional remedial action.

Clause 5. The non-transitory computer-readable medium of any of clauses 1-4, wherein the first reading further comprises a plurality of values individual corresponding to the gaming chips in at least one of a casino cage, a bank, or a vault.

Clause 6. The non-transitory computer-readable medium of any of clauses 1-5, wherein the program further causes the at least one computing device to at least determine that an RFID tag from the gaming chips is defective based at least in part on the variance.

Clause 7. The non-transitory computer-readable medium of any of clauses 1-6, wherein the at least one remedial action comprises stopping a game at a gaming table until an approval is received.

Clause 8. A system comprising: a memory; and at least one computing device coupled to the memory, the at least one computing device configured to at least: determine a first reading of gaming chips in a gaming area based at least in part on a first identification technology, the first reading comprising a plurality of first counts; determine a second reading of the gaming chips on the gaming table based at least in part on a second identification technology, the second reading comprising a plurality of second counts; and identify at least one variance between the first reading and the second reading.

Clause 9. The system of clause 8, wherein the first reading further comprises a plurality of values individual corresponding to the gaming chips in the gaming area.

Clause 10. The system of any of clauses 8-9, wherein determining the first reading of gaming chips based at least in part on the first identification technology comprises reading a plurality of RFID tags from RFID-enabled gaming chips and determining the second reading of the gaming chips based at least in part on the second identification technology comprises identifying the plurality of RFID tags in frames of a video feed from a camera.

Clause 11. The system of clause 10, wherein the at least one computing device is further configured to at least determine that an RFID tag from the RFID-enabled gaming chips is defective based at least in part on the at least one variance.

Clause 12. The system of clause 10 or 11, wherein the at least one computing device is further configured to at least determine a third reading of gaming chips in the gaming area based at least in part on a third identification technology, the third reading comprising a plurality of third counts and a plurality of third values.

Clause 13. The system of clause 12, wherein determining the third reading of gaming chips based at least in part on the third identification technology comprise reading a plurality of bar codes from the RFID-enabled gaming chips.

Clause 14. A method comprising: determining, via at least one computing device, a first reading of gaming chips in a gaming area based at least in part on a first identification technology, the first reading comprising a plurality of first counts and a plurality of first values; determining, via the at least one computing device, a second reading of the gaming chips in the gaming area based at least in part on a second identification technology, the second reading comprising a plurality of second counts and a plurality of second values; and in response to a variance between the first reading and the second reading, performing, via the at least one computing device, at least one remedial action.

Clause 15. The method of clause 14, further comprising: displaying a first indicator in response to the variance between the first reading and the second reading in a first game; and displaying a second indicator in response to no variance existing in the second game.

Clause 16. The method of clause 14 or 15, wherein the first reading further comprises a plurality of values individual corresponding to the gaming chips on at least one position on a gaming table.

Clause 17. The method of any of clauses 14-16, further comprising: reading a plurality of RFID tags from RFID-enabled gaming chips; and determining the second reading of the gaming chips based at least in part on the second identification technology comprises identifying the plurality of RFID tags in frames of a video feed from a camera.

Clause 18. The method of clause 17, further comprising determining that an RFID tag from the RFID-enabled gaming chips is defective based at least in part on the variance.

Clause 19. The method of clause 17 or 18, further comprising determining a third reading of gaming chips in the gaming area based at least in part on a third identification technology, the third reading comprising a plurality of third counts and a plurality of third values.

Clause 20. The method of clause 19, further comprising reading a plurality of bar codes from the RFID-enabled gaming chips.

The invention claimed is:

1. A non-transitory computer-readable medium embodying a program that, when executed by at least one computing device, causes the at least one computing device to at least:
   determine a first reading of gaming chips based at least in part on a first identification technology, the first reading comprising a plurality of first counts and a plurality of first values;
   determine a second reading of the gaming chips based at least in part on a second identification technology, the second reading comprising a plurality of second counts and a plurality of second values;
   in response to a variance between the first reading and the second reading, initiate or perform at least one remedial action; and
   identify a player responsible for the variance between the first reading and the second reading along with a history of the variance between the first reading and the second reading.

2. The non-transitory computer-readable medium of claim 1, wherein the remedial action is initiated or performed when the variance is greater than or equal to a threshold.

3. The non-transitory computer-readable medium of claim 1, wherein the program, when executed by the at least one computing device, further causes the at least one computing device to allow an authorized user corresponding to a degree of the variance to resume play as the at least one remedial action.

4. The non-transitory computer-readable medium of claim 1, wherein the history of the variance includes a pattern of the variance of the player or a total amount of the variance.

5. The non-transitory computer-readable medium of claim 1, wherein the program, when executed by the at least one computing device, further causes the at least one computing device to identify a managerial position of an authorized user with a history of the variance of the authorized user.

6. The non-transitory computer-readable medium of claim 1, wherein the program, when executed by the at least one computing device, further causes the at least one computing device to determine whether a specific statistical property of the variance is greater than or equal to a threshold.

7. The non-transitory computer-readable medium of claim 1, wherein the program, when executed by the at least one computing device, further causes the at least one computing device to calculate a ratio of a number of games played to the variance.

8. The non-transitory computer-readable medium of claim 1, wherein the first reading is determined for wagered gaming chips, and the second reading is determined for gaming chips moved in/from chip tray.

9. The non-transitory computer-readable medium of claim 1, wherein the program, when executed by the at least one computing device, further causes the at least one computing device to:

determine an outcome of each game based on playing cards played, and for each game, determine the variance in gaming chips paid to a player based on the outcome of the game.

10. A system comprising:

a memory; and at least one computing device coupled to the memory, the at least one computing device configured to at least:

determine a first reading of gaming chips based at least in part on a first identification technology, the first reading comprising a plurality of first counts and a plurality of first values;

determine a second reading of the gaming chips based at least in part on a second identification technology, the second reading comprising a plurality of second counts and a plurality of second values;

in response to a variance between the first reading and the second reading, initiate or perform at least one remedial action; and identify a player responsible for the variance between the first reading and the second reading along with a history of the variance between the first reading and the second reading.

11. The system of claim 10, wherein the remedial action is performed when the variance is greater than or equal to a threshold.

12. The system of claim 10, wherein the at least one computing device is further configured to allow an authorized user corresponding to a degree of the variance to resume play after ceasing the at least one remedial action.

13. The system of claim 10, wherein the history of the variance includes a pattern of the variance of the player or a total amount of the variance of the player.

14. The system of claim 10, wherein the at least one computing device is further configured to identify a managerial position of an authorized user with a history of the variance of the authorized user.

15. The system of claim 10, wherein the at least one computing device is further configured to determine whether a specific statistical property of the variance satisfies a threshold.

16. The system of claim 10, wherein the at least one computing device is further configured to calculate a ratio of games played to the variance.

17. The system of claim 10, wherein the first reading is determined for wagered gaming chips, and the second reading is determined for gaming chips moved in/from chip tray.

18. The system of claim 10, wherein the at least one computing device is further configured to:

determine an outcome of each game based on playing cards played; and for at least one, determine the variance in gaming chips paid to a player based on the outcome of the game.

19. A method comprising:

determining, via at least one computing device and based at least in part on a first identification technology, a first reading of gaming chips in a gaming area, the first reading comprising a plurality of first counts and a plurality of first values;

determining, via the at least one computing device and based at least in part on a second identification technology, a second reading of the gaming chips in the gaming area, the second reading comprising a plurality of second counts and a plurality of second values;

in response to a variance between the first reading and the second reading, initiating or performing, via the at least one computing device, at least one remedial action; and identifying a player responsible for the variance between the first reading and the second reading along with a history of the variance between the first reading and the second reading.

20. The method of claim 19, wherein the remedial action is performed when the variance satisfies a threshold.

21. The method of claim 19, further comprising allowing an authorized user corresponding to a degree of the variance to resume play after ceasing the at least one remedial action.

22. The method of claim 19, wherein the history of the variance includes at least one of a pattern of the variance of the player and a total amount of the variance of the player.

23. The method of claim 19, further comprising identifying a managerial position of an authorized user with a history of the variance of the authorized user.

24. The method of claim 19, further comprising determining whether a specific statistical property of the variance satisfies a threshold.

25. The method of claim 19, further comprising calculating a ratio of games played to the variance.

26. The method of claim 19, wherein the first reading is determined for wagered gaming chips, and the second reading is determined for gaming chips moved in/from chip tray.

27. The method of claim 19, further comprising:

determining an outcome of each game based on playing cards played; and for each game, determining the variance in gaming chips paid to a player based on the outcome of the game.

* * * * *